Oct. 29, 1929.　　　　W. B. FULTON　　　　1,733,659
LIQUID LEVEL REGULATOR OR THE LIKE
Filed July 19, 1927
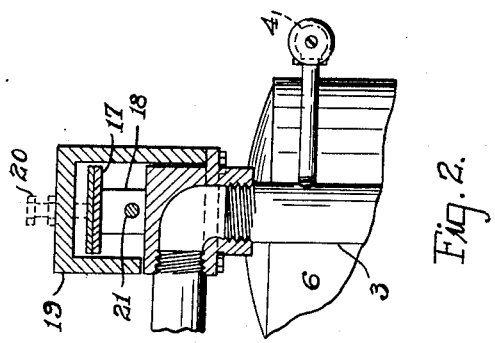
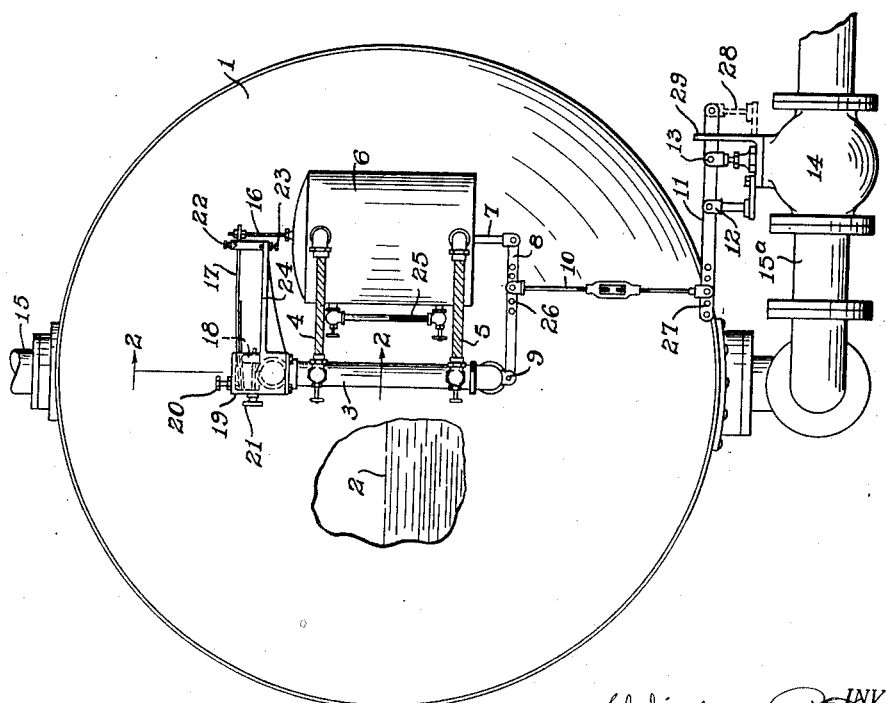
INVENTOR.
William B. Fulton
BY
ATTORNEY.

Patented Oct. 29, 1929

1,733,659

UNITED STATES PATENT OFFICE

WILLIAM B. FULTON, OF MIDDLETOWN, OHIO

LIQUID-LEVEL REGULATOR OR THE LIKE

Application filed July 19, 1927. Serial No. 206,976.

This invention relates to improvements in liquid level regulators.

In the accompanying drawings which serve for illustrating the invention in one form:

Fig. 1 is a view in elevation of the improved mechanism as applied to a horizontally disposed tank;

Fig. 2 is a detail sectional view on line 2—2 of Fig. 1.

The objects attained in the invention consist in a liquid level regulator for open or closed tanks, etc., of which all parts of the regulating mechanism are outside the enclosure, thus rendering unnecessary provision of manholes or ports in closed tanks as required for internal liquid level regulating mechanism, as floats or the like, commonly used in apparatus of this character.

The improved mechanism has the further advantage of practical infallibility in operation, the unit as a whole being composed of simple mechanism of rugged construction and positive action, none of the parts being subject to material wear or likely to be rendered out of adjustment by use. The advantage thus gained over internal liquid level regulating mechanisms in which floats are used which are subject to leakage and collapsing under high pressure, is an important factor tending to more dependable operation of apparatus of this character.

As illustrated in Fig. 1, the improved mechanism is shown as applied to a horizontal water tank 1, having inlet and outlet lines 15—15ª, in which the level of water is indicated at 2. A vertically extended water level and pressure regulating pipe 3 is connected at both ends to the tank head, the connections of the pipe being above and below the level of the water in the tank. Connected to pipe 3 by upper and lower flexible metallic hose 4—5 is a float tank 6 which is supported on its under side by means of a stem 7 on one end of a lever 8 fulcrumed at 9 and connected by means of an adjustable link 10 to a second lever 11 which is fulcrumed at 12 and connected on the opposite side of the fulcrum to the valve stem 13 of a valve 14 in line 15ª, a guide 29 serving for supporting the free end of the lever laterally.

The upper end of the tank 6 is connected by a flexible link 16 to the free end of a leaf spring 17 which is supported on a slidable fulcrum 18 in a housing 19 supported on pipe 3, an adjusting screw 20 supported in the housing serving for regulating the tension of the spring which acts as a lever for moving tank 6 upward. A threaded stem 21 supported in housing 19 and connected at its inner end to part 18 serves for shifting the fulcrum axially relative to spring 17. Adjustable stops 22—23 supported in an extended arm 24 of housing 19 serve for limiting the movement in opposite directions of the end of spring 17 and tank 6.

In the operation of the regulating mechanism the hose connections 4—5 are open, thus there is free movement of water between tanks 1—6 through the lower connection 5, the upper connection 4 serving for maintaining equal air pressures in the upper portions of the tanks, thus to maintain the water in the tanks at the same level, as indicated by a common water gauge 25. The mechanism is adapted to be adjusted by regulating the tension of spring 17 and effecting adjustments of the connections of link 10 with levers 8—11, as provided for by a plurality of apertures 26—27 in the levers, for maintaining, except as to slight fluctuations, a predetermined level of water in tank 1. The regulating mechanism is illustrated in Fig. 1 in the relative positions of the parts when the water in the tanks is at normal level, tank 6 being in raised position and levers 8—11 in position for closing valve 14.

When the water in tanks 1—6 rises above normal level, the weight of tank 6, increased by the increase of water, will gradually overcome the resistance of spring 17, thus causing the tank to move downward and acting through the connections 8—13 to open, or partially open as the case may be, valve 14, the extent of opening of the valve depending on the extent of the rise of the water in the tanks. With the opening of the valve the water flows from tank 1 until its normal level is again attained, the weight of tank 6 being thus reduced, spring 17 acts on the tank to raise the same to normal position, thus acting to close valve 14.

The regulating mechanism is very responsive to the changes in the level of the water in the tanks. Thus normal level of the water is maintained by the automatic action of the mechanism with only slight fluctuations above and below normal level under ordinary conditions of operation.

A connection for reversing the operating relation between lever 11 and valve stem 13 is indicated by dotted outline at 28. The modification contemplates that valve 14 may be applied in either the outlet or inlet line, the water level regulating mechanism being thus adapted for controlling either the inflow or the outflow of the tank.

The liquid level regulating mechanism as shown in the drawings serves for illustrating general practice of the invention, the improved mechanism being adapted for maintaining or regulating the level of liquids in open or closed tanks by controlling the operation of valves or pumps in the receiving or discharging lines, as the case may be.

While my invention is herein shown and described as applied to liquid level regulators, it will be seen that the principle of the invention will apply generally for controlling valves, electric switches for governing the operation of electric pumps, or prime movers of any sort, as engines, steam pumps, etc., to stop, start, or regulate the speed thereof, the controlling agency being a body of liquid, variable as to its level, in a tank, vat, steam vessel, etc., and the external float connections responsive to the changes in the level of the liquid for controlling the operation of such apparatus.

Having described my invention, I claim:

1. A liquid level regulator including in combination with a main liquid container, connected with liquid receiving and discharging lines, a single pipe communicating with the main container above and below the level of the liquid therein, a liquid container supported externally of the main container and movable in one direction by gravity, flexible conduits connecting the external container with said pipe for equalizing the level of liquid in said containers, a spring-tensioned counter-balancing element supported on said pipe adapted to be fulcrumed variably for regulating the tension thereof and connected to the external container for moving the same at predetermined weights in the opposite direction, and a valve in one of said lines operably associated with the movement of the external container for regulating the movement of the liquid relative to the main container through said lines.

2. An automatic regulator for prime movers consisting in a primary container for liquid, a pipe communicating with the container above and below the level of the liquid therein, a secondary container for liquid supported relative to the primary container and movable in one direction by gravity, flexible conduits connecting the secondary container to said pipe for equalizing the level of the liquid in the containers, a spring-tensioned counter-balancing element fulcrumed on said pipe and connected to the secondary container, means for regulating the tension of the counter-balancing element and for shifting the fulcrum thereof for moving the secondary container at variable weights in the opposite direction, and means governing the operation of the prime mover controlled by the movement of the secondary container.

3. A liquid level regulator including in combination with a main liquid container, connected with liquid receiving and discharging lines, a single pipe communicating with the main container above and below the level of the liquid therein, a liquid container supported externally of the main container and movable in one direction by gravity, flexible conduits connecting the external container with said pipe for equalizing the level of the liquid in said containers, a laterally extended bracket supported on said pipe, a counter-balancing element connected to the external container for moving the same at a predetermined weight in the opposite direction, a fulcrum for the counter-balancing element shiftable on said bracket for regulating said element, and a valve in one of said lines operably associated with the movement of the external container for regulating the movement of the liquid relative to the main container through said lines.

In testimony whereof I affix my signature.

WILLIAM B. FULTON.